United States Patent [19]

Dorfman et al.

[11] 3,992,480

[45] Nov. 16, 1976

[54] FIRE RETARDANT UNSATURATED POLYESTERS

[75] Inventors: Edwin Dorfman; Willis T. Schwartz, Jr., both of Grand Island; Raymond R. Hindersinn, Lewiston, all of N.Y.

[73] Assignee: Hooker Chemicals & Plastics Corporation, Niagara Falls, N.Y.

[22] Filed: June 6, 1975

[21] Appl. No.: 584,447

Related U.S. Application Data

[63] Continuation-in-part of Ser. No. 383,747, July 30, 1973, abandoned.

[52] U.S. Cl. .............................. 260/863; 260/40 R; 260/45.75 C; 260/75 H; 428/480
[51] Int. Cl.² .................. C08L 67/06; C08F 283/00
[58] Field of Search ............... 260/863, 40 R, 75 H, 260/45.75 C; 428/480

[56] References Cited

UNITED STATES PATENTS

| | | | |
|---|---|---|---|
| 2,610,920 | 9/1952 | Hopkinson | 106/15 |
| 2,891,033 | 6/1959 | Savage | 260/37 |
| 2,931,784 | 4/1960 | Raymond | 260/45.4 |
| 3,028,360 | 4/1962 | Brooks et al. | 260/45.4 |
| 3,154,515 | 10/1964 | Berridge | 260/33.8 |
| 3,274,293 | 9/1966 | Elfers et al. | 260/869 |
| 3,324,158 | 6/1967 | Cyba et al. | 260/439 |
| 3,326,832 | 6/1967 | Rauschenbach et al. | 260/28.5 |
| 3,333,022 | 7/1967 | Reiners et al. | 260/869 |
| 3,340,226 | 9/1967 | Stivers | 260/45.75 |
| 3,360,589 | 12/1967 | Raichle et al. | 260/863 |
| 3,418,267 | 12/1968 | Busse | 260/33.8 |
| 3,437,715 | 4/1969 | Da Fano | 260/863 |
| 3,573,215 | 3/1971 | Nametz et al. | 252/192 |
| 3,627,657 | 12/1971 | Nistri et al. | 204/159.15 |
| 3,671,469 | 6/1972 | Doorenbos | 260/2 H |
| 3,697,456 | 10/1972 | Pitts | 260/2.5 AJ |
| 3,766,111 | 10/1973 | Metzner et al. | 260/28 |
| 3,825,520 | 7/1974 | Parts et al. | 260/45.75 R |

FOREIGN PATENTS OR APPLICATIONS

| | | |
|---|---|---|
| 1,387,400 | 12/1964 | France |
| 1,387,400 | 5/1966 | France |

OTHER PUBLICATIONS

Pitts, "Antimony–Halogen Synergistic Reactions in Fire Retardants," Journal of Fire & Flammability, pp. 51–84 (1972).

*Primary Examiner*—Donald E. Czaja
*Assistant Examiner*—Earl A. Nielsen
*Attorney, Agent, or Firm*—Peter F. Casella; James F. Mudd

[57] ABSTRACT

Highly fire retardant unsaturated polyester resins which exhibit low burning rates, low smoke generation and beneficial char formation in the presence of a flame are provided by incorporating up to about 5 weight percent of copper or a copper compound in a halogen containing unsaturated polyester of a polycarboxylic compound and a polyhydric alcohol having greater than about 4 weight percent halogen based on the weight of unsaturated polyester resin and a copolymerizable unsaturated monomer. The unsaturated polyester resins are copolymerized with an unsaturated monomer for use in castings, laminated products and other reinforced articles.

33 Claims, No Drawings

FIRE RETARDANT UNSATURATED POLYESTERS

REFERENCE TO PRIOR APPLICATION

This is a continuation-in-part of copending application Ser. No. 383,747, filed July 30, 1973, and now abandoned.

BACKGROUND OF THE INVENTION

Much effort has been expended in discovering and developing useful fire retardant polymer composition systems, and numerous examples of fire retardant polymers have appeared in the literature and some of them are in commercial use. But, the fire retardant requirements for polymeric materials have become evermore stringent as technology has become more sophisticated. Thus, whereas low burning rates were once the sole objective of research for fire retardant polymers, now low smoke generation and char formation characteristics are also significant.

Concurrently, there has been a desire on the part of plastics fabricators to retain the other beneficial qualities of the base polymer while enhancing the fire retardant properties. But heretofore, efforts to impart fire retardancy to polymer systems has resulted in diminishing the other useful properties. Thus, normally translucent polyester resins have been rendered opaque by the incorporation of sufficient quantities of antimony trioxide to render the polyester resins sufficiently fire retardant for certain uses.

Accordingly, it is an object of this invention to provide superior fire retardant unsaturated polyester resins that not only have low burning rates, but also exhibit low smoke generation when in contact with a flame.

It is also an object of the invention to provide superior fire retardant polyester resins that develop a beneficial, insulating layer of char in the presence of a flame which inhibits further combustion of the polymer.

It is still another object of the invention to render unsaturated polyester resins fire retardant without diminishing or deteriorating other useful properties of the polymer system.

These and other objects are accomplished by this invention which is described in detail hereinafter.

SUMMARY OF THE INVENTION

The superior fire retardant polymer compositions of the invention comprise an $\alpha,\beta$-ethylenically unsaturated polyester of a polycarboxylic compound and a polyhydric alcohol which contains a halogen in a proportion of greater than about 4 weight percent, and an effective fire retardant proportion up to about 5 weight percent of copper or a copper compound, wherein the foregoing proportions are based on the weight of the unsaturated polyester and a copolymerizable unsaturated monomer.

The preferred halogen containing polyesters of the invention are those wherein the halogen is provided by a Diels Alder adduct of a hexahalocyclopentadiene and a polycarboxylic compound or polyhydric alcohol containing aliphatic carbon-to-carbon unsaturation. The preferred adducts are chlorendic acid or chlorendic anhydride.

Various copper compounds can be employed in the compositions of the invention depending on the end results desired. Thus, where it is desired to retain the translucent character of the unsaturated polyester colorless copper salts can be employed, or copper salts that permit the transmission of light when incorporated in the polyester resin system can be used. The various copper oxides and other copper salts, including various organic copper compounds can be employed.

The unsaturated polyester resin containing the copper compound of the invention is copolymerized with an ethylenically unsaturated monomer, optionally in the presence of a reinforcing agent or filler, to provide the final polymerized product.

DESCRIPTION OF EMBODIMENTS

The Polyesters

The unsaturated polyesters useful in the invention are generally those commonly known in the art, and are generally the reaction product of a polycarboxylic compound and a polyhydric alcohol. By polycarboxylic compounds is meant the polycarboxylic acids, polycarboxylic anhydrides, polycarboxylic acid halides, and polycarboxylic acid esters. The unsaturation can be provided in either or both the polycarboxylic compound or the polyhydric alcohol. Suitable unsaturated polycarboxylic acids having aliphatic carbon-to-carbon double bonds, and the corresonding acid halides, esters, and anhydrides can include maleic, fumaric, chloromaleic, ethylmaleic, itaconic, citraconic, zeronic, pyrocinchoninic, mesaconic, aconitic and acetylene dicarboxylic, either alone or in mixtures.

Illustrative of the unsaturated polyhydric alcohols having aliphatic carbon-to-carbon double bonds, which can be used in providing the unsaturation in the linear polyester molecules are compounds such as butene diol, pentene diol, the unsaturated hydroxy ethers such as allyl or vinyl glycerol ethers, allyl or vinyl pentaerythritol ethers and the like.

The saturated polycarboxylic compounds useful in the preparation of the polyesters can be aliphatic, cycloaliphatic, aromatic or heterocyclic. Illustrative of these polycarboxylic acids, acid halides, acid anhydrides and acid esters include phthalic, isophthalic, terephthalic, tetrachlorophthalic, tetrabromophthalic, dibromotetrahydrophthalic, chlorendic, adipic, succinic, dichlorosuccinic, and mixtures thereof.

Suitable saturated polyhydric alcohols for use in the preparation of the polyester resins include ethylene glycol, diethylene glycol, propylene glycol, dipropylene glycol, butane diol, pentane diol, hexane diol, dibromoneopentyl glycol, 1,4-cyclohexane dimethanol, glycerol, mannitol, sorbitol, bisphenols, substituted bisphenols, hydrogenated bisphenols and the mixtures thereof.

The properties of the polyester resins can be modified by the incorporation of suitable monofunctional carboxylic compounds and alcohols. Illustrative examples of such compounds are 2,2-dichloroethanol; 1,1-dibromo-2-propanol; 2,2,2-tribromoethanol; 1,1,3,3-tetrabromo-2-propanol; 1,1,1-trifluoro-2-propanol and 2,3-dibromo-1propanol. An example of a carboxylic compound is pentachlorophenoxy acetic acid.

The properties of the polyesters can be varied by using mixtures of the various types of acids and alcohols, such as an unsaturated acid, a saturated acid and a saturated alcohol.

The preferred unsaturated polyesters of the invention contain either an adduct of hexahalocyclopentadiene and a polycarboxylic compound containing aliphatic carbon-to-carbon unsaturation or an adduct of hexahalocyclopentadiene and a polyhydric alcohol containing aliphatic carbon-to-carbon unsaturation. The preferred unsaturated polyesters are the reaction products of a polycarboxylic adduct of hexahalocyclopentadiene, another carboxylic compound containing carbon-to-carbon unsaturation and a polyhydric alcohol. Such a product is disclosed and claimed in U.S. Pat. No. 2,779,701, issued Jan. 29, 1957. Other methods for incorporating either polycarboxylic or polyhydric alcohol adduct of hexahalocyclopentadiene include: (1) the reaction of a polycarboxylic adduct of hexahalocyclopentadiene, an unsaturated polyhydric alcohol containing aliphatic carbon-to-carbon unsaturation, disclosed and claimed in U.S. Pat. No. 2,863,794, issued Dec. 9, 1958; (2) the reaction of a polyhydric alcohol adduct of hexahalocyclopentadiene with a polycarboxylic compound containing aliphatic carbon-to-carbon unsaturation disclosed and claimed in U.S. Pat. No. 2,779,700, issued Jan. 29, 1957; and (3) the reaction of a polyhydric alcohol adduct of hexahalocyclopentadiene with another alcohol containing aliphatic carbon-to-carbon unsaturation and a polycarboxylic acid, disclosed and claimed in U.S. Pat. No. 2,863,795, issued Dec. 9, 1958. An alternate method for incorporating an adduct of hexahalocyclopentadiene into a polyester resin involves reacting an unsaturated polyester resin with a copolymerizable compound containing an adduct of hexahalocyclopentadiene, such as disclosed and claimed in U.S. Pat. No. 2,783,215, issued Feb. 26, 1957. The polyester resins containing the polycarboxylic and polyhydric alcohol adducts of hexahalocyclopentadiene can be modified by incorporating therein saturated carboxylic acids and anhydrides, as disclosed and claimed in U.S. Pat. No. 2,890,144, issued June 9, 1959, and U.S. Pat. No. 2,898,256, issued August 4, 1959. When used in this specification, the term polycarboxylic compound refers to the polycarboxylic acids, acid anhydrides, acid halides and acid esters, of either the aliphatic or aromatic type.

Among the adducts of hexahalocyclopentadiene and polycarboxylic compounds which may be used are: 1,4,5,6,7,7-hexachlorobicyclo-(2.2.1)-5-heptene-2,3-dicarboxylic acid and anhydride, also known as chlorendic acid and anhydride; 1,4,5,6,7,7-hexabromobicyclo-(2.2.1)-5-heptene-2,3-dicarboxylic acids; 1,4,5,6,7,7,-hexachloro-2methylbicyclo-(2.2.1)-5-heptene-2,3-dicarboxylic anhydride; 1,4,5,6,7-tetrachloro-7,7-difluorobicyclo-(2.2.1)-5-heptene-2,3-dicarboxylic acid; 1,4,5,6,7,7-hexachlorobicyclo-(2.2.1)-5-heptene-2-acetic-2-carboxylic anhydride; 5,6,7,8,9,9-hexachloro-1,2,3,4,4a,5,8,8a-octahydro-5,8-methano-2,3-naphthalene dicarboxylic acid and anhydride; 1,2,3,4,5,6,7,7-octachloro-3,6-methano-1,2,3,6-tetrahydrophthalic acid and anhydride; 2,3-dicarboxy-5,8-endomethylene-5,6,7,8,9,9-hexachloro-1,2,3,4,4a,5,8,,8a-octahydronaphthalene anhydride; 2,3-bis(ethylene carboxy)-1,4,5,6,7,7-hexachlorobicyclo(2.2.1) 5-heptene; and 1,4,5,6,7,7-hexachlorobicyclo-(2.2.1)-5-heptene-2,3-dicarbonyl chloride.

Among the adducts of hexahalocyclopentadiene and polyhydric alcohols which may be used are: 1,4,5,6,7,7-hexachloro-2,3-bis-hydroxymethylbicyclo-(2.2.1)-5-heptene; 1,4,5,6,7,7-hexachloro-2,3-bis-hydroxymethylbicyclo-(2.2.1)-2,5-heptadiene; 3-(1,4,5,6,7,7-hexachlorobicyclo-(2.2.1)-5-heptene-2-yl)-methoxy-1,2-propanediol; 1,4,5,6-tetrachloro-7,7-difluoro-2,3-bis-hydroxymethylbicyclo-(2.2.1)-5-heptene; 1,4,5,6,7,7-hexabromo-2,3-bis-hydroxy-methyl-bicyclo-(2.2.1)-5-heptene; 3-(1,4,5,6-tetrachloro-7,7-difluorobicyclo-(2.2.1)-5-heptene-2-yl)-methoxy-1,2-propane diol. These compounds and methods of preparation are disclosed in U.S. Pat. No. 3,007,958, issued Nov. 7, 1961.

It is also within the scope of the invention to use other halogen-containing polyesters such as those derived from tetrachlorophthalic acid or anhydride and tetrabromophthalic acid or anhydride.

The halogen can be provided in the polyesters of the invention by a combination of the foregoing methods. Thus, an unsaturated polyester can be prepared using a halogenated dibasic acid such as chlorendic acid, and a monobrominated alcohol such as dibromopropanol. The halogen can also be provided in the polyesters by post-halogenation of a non-halogenated polyester such as disclosed in U.S. Pat. No. 3,536,782, which is incorporated herein by reference.

The polycarboxylic compounds and polyhydric alcohols required in the production of the foregoing halogen-containing adducts and polyesters can be provided by using any of the compounds disclosed hereinbefore.

The temperature for the reaction between polyhydric alcohols and polybasic acids ranges from about 100° to 200° centigrade, although higher or lower temperatures can be used. Esterification catalysts such as para-toluene sulfonic acid, benzene sulfonic acid, beta-naphthalene sulfonic acid and the like, or amines such as pyridine, triethyl amine, quinoline and the like can be added to the reaction mixture. The proportion of polyhydric alcohol is approximately controlled by the total mole proportion of acids in the esterification reaction mixture. It is also preferred to react the polyhydric alcohols and polybasic acids in roughly equimolar proportion; however, either the acids or alcohols can be used in substantial excess, if it is desired to form a low molecular weight polyester resin.

Unsaturated Monomers

A variety of ethylenically unsaturated monomers can be used for curing or cross-linking the ethylenically unsaturated polyesters. It is generally preferred that addition polymerizatiion be practiced since no by-product ammonia or water is formed, and the problems resulting therefrom are not experienced. The vinylidene monomers useful in curing the thermoplastic unsaturated polymers include vinylic compounds or mixtures thereof capable of cross-linking ethylenically unsaturated polymer chains at their points of unsaturation. Usually they contain the reactive groups $H_2C=C<$. Specific examples include styrene, chlorostyrenes, methyl styrenes such as alpha methyl styrene, p-methyl styrene, vinyl benzyl chloride, divinyl benzene, indene, unsaturated esters such as: methyl methacrylate, methyl acrylate and other lower aliphatic esters of acrylic and methacrylic acids, allyl acetate, diallyl phthalate, diallyl succinate, diallyl adipate, dially sebacate, diethylene glycol bis(allyl carbonate), triallyl phosphate and other allyl esters, and vinyl toluene, diallyl chlorendate, diallyl tetrachlorophthalate, ethylene glycol diacrylate, ethylene glycol dimethacrylate, ethylene glycol diethacrylate, and mixtures thereof. The monomer may be admixed in the polymer in an amount sufficient to produce a thermoset polymer and the admixture heated to an elevated temperature in the presence of a suitable catalyst to cross-link or cure the polymer. With proper catalyst systems such as cobalt naphthenate and methylethyl ketone peroxide, room temperature cures are obtained.

The cross-linking agent can be advantageously combined with the polymerizable polyester while the unsaturated polyester and the olefinic cross-linking agent are at an elevated temperature thereby facilitating solution and mixing. To prevent premature polymerization at this stage, a polymerization inhibitor is advantageously added to the mixture, or preferably to one of its components prior to mixing, especially if the mixture is to be stored or shipped in commerce prior to curing. Alternatively, or in addition to including a polymerization inhibitor, a catalyst and/or promoter for the copolymerization may be added, particularly if it is desired to make available in commerce a composition which is ready for polymerization and does not require further chemical additions in order to be used, as is commonly known in the art.

The polymerization inhibitors generally are added in the order of 0.001 to 1 weight percent of the mixture. Among the inhibitors which may advantageously be employed to prevent the premature polymerization of the mixture of polymerizable polyester and olefinic cross-linking agents, particularly if the mixture is to be stored or shipped in commerce prior to curing, are substances such as hydroquinone, benzoquinone, paratertiarybutyl catechol, para-phenylene diamine, trinitrobenzene, picric acid, and the like.

The proportion of olefinic cross-linking agent to unsaturated polyester can be varied within the ultimate limits of each without departing from the scope of the invention, necessary to produce an infusible, insoluble, polyester resin. In general, the concentration of the unsaturated polyester in the olefinic cross-linking agent can vary between about ten and ninety percent. Polymerization catalysts are preferably added to the mixture of unsaturated polyester and olefinic cross-linking agent to effect setting or curing. Catalysts such as benzoyl peroxide, acetyl peroxide, lauryl peroxide, methylethyl ketone peroxide, cumene hydroperoxide and the like are satisfactory. Such catalysts are used in proportions of 0.01 to ten percent of the total resin, depending on the efficiency of their action and whether or not substances which inhibit polymerization are present in the mixture. The polymerization reaction can also be hastened by adding promoters such as metals or metal salts, cobalt resinates, cobalt maleate, cobalt naphthenate and the like, or amines such as dibutylamine, or mercaptans such as dodecyl mercaptan. These are used in proportions similar or smaller to that stated for the catalysts.

The Copper Compounds

In the preparation of translucent polyester laminates and other products of the invention, copper salts that permit the transmission of light when incorporated in the cured polyester are employed. Suitable copper salts are the colorless copper salts such as anhydrous copper sulfate and copper cyanide. Other suitable salts which permit light transmission in the cured polyester include cupric chloride, cupric bromide, copper chloride dihydrate, copper sulfate pentahydrate, copper hydroxide chloride (paratacamite), basic copper chloride (atacamite), copper oxychloride (a mixture of paratacamite and atacamite), copper carbonate, copper borate, copper phosphate, and the like. The copper compounds named hereinabove are substantially insoluble in the polyester when admixed with a copolymerizable unsaturated monomer.

Other substantially insoluble copper compounds that can be used in accordance with the invention include copper chlorendate, copper tungstate, copper molybdate, copper tetrafluoroborate, copper thiocyanate, copper chromate, cupric formate, cupric gluconate, cupric oxalate, copper phthalocyanine, cupric tartrate and the like.

Also useful in the compositions of the invention are the copper oxides, such as cuprous and cupric oxides.

Other copper compounds are cupric ethylacetoacetate, copper glycinate, cupric hexafluoroacetylacetonate, cupric hydroxyacetate, cupric lactate, cupric naphthenate, cupric octoate, cupric propionate, cupric stearate, cupric acetylacetonate, cupric butyrate, cupric isobutyrate, cupric citrate, cupric cyclohexanebutyrate, cupric dimethyl dithiocarbamate, cupric trifluoroacetylacetonate and cupric undecylenate.

Copper compounds which have desirable fire retardant properties but which may adversely affect the stability or cure of the polymer composition can be employed if such copper compounds are used in an inactive form such as encapsulated or reacted or complexed with another compound. Such copper compounds are copper acetylacetonate, cuprous chloride, cupric nitrate and cupric acetate, copper acrylate, copper naphthenate and copper stearate. These compounds can be encapsulated with gelatin or other polymeric materials.

The copper or copper compounds are generally incorporated in the compositions of the invention in a proportion up to about 5 weight percent of copper or copper compound based on the weight of the unsaturated polyester and the copolymerizable unsaturated monomer, which corresponds to a proportion of up to about 50 weight percent of copper or copper compound based on the weight of the unsaturated polyester. Preferably, the proportion of copper or copper compound is in the range of about 0.5 to about 2 weight percent of copper or copper compound based on the weight of unsaturated polyester resins and monomer, which corresponds to a range of about 0.55 to about 20 weight percent of copper or copper compound based on the weight of unsaturated polyester.

The metallic copper and copper compounds are incorporated into the polyesters in finely divided form. Preferred are particles passing through a 200 mesh standard sieve. Where translucent plastics are desired, the particulate copper or copper compounds should not contain a sufficient quantity of fine particles around the wave length of light, i.e., about 0.1 to 1 micron, to cause undesirable light scattering and resultant decrease in translucence. In practice, it has been observed that copper compounds pulverized to pass completely through a 325 mesh screen contain sufficient fine particles to reduce translucency of the polyester.

The unsaturated polyester resins of the invention generally contain greater than about 4 weight percent up to about 40 weight percent of halogen based on the weight of the unsaturated polyester resin and the copolymerizable unsaturated monomer, which corresponds to greater than about 4.4 weight percent of halogen based on the weight of the unsaturated polyester resin. The proportion of halogen is preferably greater than 15 weight percent when the halogen is chlorine.

The compositions of the invention provide very effective fire retardance without the need for antimony trioxide which is so often used in commercial formulations to achieve low burning rates. The exclusion of antimony trioxide is especially preferred when it is desired to retain the translucent character of the polyester resins of the invention. The copper compounds and halogen component of the polyesters can be the sole fire retardant agents present in the compositions of the invention.

The Curing Process

The polymerization conditions for effecting the cross-linking reaction between the unsaturated polyesters of this invention and the olefinic cross-linking agent may be selected from a wide variety of techniques but usually involve the application of heat or light. Although pressure is not a required condition for effecting polymerization of the polymerizable mixtures embraced within this invention, it is sometimes advantageously employed, particularly when it is desired to make laminates in preformed shape. The pressures found satisfactory for this purpose are relatively low compared to those required for molding or laminating other type resins than involved herein and may be of the order of that obtained by pressing glass plates having a fiber glass mat or laminate impregnated with the polyester resin sandwiched therebetween.

The temperature at which polymerization is effected depends on a variety of factors, particularly the boiling point of the olefinic cross-linking agent and the exothermic characteristics of the polymerization mixture. A temperature is selected which will give a suitable reaction rate and yet not cause substantial volatilization, and in the case of producing very thick castings, which will not produce a product which is crackcrazed.

The properties of the compositions of this invention can be varied substantially by incorporating modifying agents before, during or after any of the processing steps employed. For example, instead of producing articles of commerce from the compositions of this invention which are in the form of castings or laminates as previously described herein, a foamed type article may be made by incorporating a small percentage of a foaming agent such as sodium bicarbonate into the solution of unsaturated polyester dissolved in monoolefin and thereafter effecting the copolymerization in the presence of catalyst and heat to produce the foamed article. Formulations which are useful for making moldings embodying the compositions of this invention may be made by mixing into the unsaturated linear polyester and olefinic cross-linking agent mixture, an inert filler such as chopped fiber glass rovings, macerated fabric, asbestos fibers, mica, etc., which serve as fibrous reinforcing media and incorporating a small percentage of a mold lubricant, catalyst and/or promoter. Auxiliary fire retardant additives such as hydrated alumina can be used to add to the fire retardance provided by the halogen and copper.

It is to be understood that dyes, pigments, plasticizers, lubricants and various other modifying agents are contemplated as being incorporated in certain formulations to produce compositions embraced in this invention in order to obtain or accentuate any given property.

The following examples are presented to illustrate this invention. It is to be understood that the examples are not to be construed as limiting the invention. In this specification and claims, all temperatures are in degrees centigrade and all parts are by weight, unless otherwise indicated.

Preparation of Polyesters

EXAMPLE 1 (Resin I)

An unpolymerized liquid unsaturated polyester resin was prepared by esterifying about 157 parts of ethylene glycol and 38 parts of diethylene glycol With about 668 parts of 1,4,5,6,7,7-hexachlorobycyclo-(2.2.1)-5-heptene-2,3-dicarboxylic acid and about 136 parts of fumaric acid. About 30 parts of styrene and about 70 parts of product produced by the esterification reaction were mixed together until complete solution was obtained to give a clear, substantially colorless solution of liquid polyester resin having a viscosity of about 30 poises at 25 degrees centigrade on a Gardner bubble viscometer and having a chlorine content of about 30 percent by weight of the total.

EXAMPLE 2 (Resin II)

An unpolymerized liquid unsaturated polyester resin was prepared by esterifying about 76 parts of propylene glycol with about 128 parts of 1,4,5,6,7,7-hexachlorobicyclo-(2.2.1)-5-heptene-2,3-dicarboxylic acid and about 76 parts of fumaric acid. About 45 parts of styrene and about 55 parts of product produced by the esterification reaction were mixed together until complete solution was obtained to give a clear, substantially colorless solution of liquid polyester resin having a chlorine content of about 19 percent by weight of the total.

EXAMPLE 3 (Resin III)

An unpolymerized liquid unsaturated polyester resin was prepared by esterifying about 397 parts of ethylene glycol with about 232 parts of fumaric acid and about 1258 parts of tetrachlorophthalic anhydride to provide a polyester of acid number 28 mgKOH/gram. About 720 parts of styrene were mixed with 1674 parts of the esterification product until complete solution was obtained to give a clear substantially colorless solution of liquid polyester having a chlorine content of about 26 percent.

EXAMPLE 4 (Resin IV)

An unpolymerized liquid unsaturated polyester resin was prepared by esterifying about 19 parts of diethylene glycol and about 140 parts of ethylene glycol with 118 parts of maleic anhydride, 57 parts of phthalic anhydride, 375 parts of tetrabromophthalic anhydride and 3 parts of sodium acetate. About 271 parts of styrene and 0.1 part of hydroquinone were mixed with polyester until complete solution was obtained to give a clear, substantially colorless solution of liquid polyester having a viscosity of about 4 poises at 25 degrees centigrade on a Gardner bubble viscometer and having a bromine content of about 26 percent.

EXAMPLE 5 (Resin V)

A mixture of 194.5 parts (0.5 mole) of chlorendic acid, 98.1 parts (1.0 mole) of maleic anhydride, 217.9 parts (1.0 mole) of 1,2-dibromopropanol and 24.8 parts (0.40 mole) of ethylene glycol and 36.8 parts (0.40 mole) glycerol were heated, under a steady nitrogen sparge, to and maintained at about 165 degrees, while collecting the water formed as a distillate. After about 12 hours, the acid number of the reaction mixture had decreased to 46. A small quantity, about 0.10 part, of tolylhydroquinone was added to the mixture and the reaction was continued for an additional four hours at which time the acid number was about 34. The resultant polyester product was analyzed and found to contain 26.0 percent bromine, 20.0 percent chlorine and the average molecular weight of the polymer chains was 1150. An amount of styrene equivalent to about one third the weight of the polyester mass was added to the hot mass and the resultant solution was cooled to ambient temperature. The viscosity (Brookfield) of the solution was 1620 cps at 25°.

EXAMPLE 6 (Resin VI)

This resin was prepared as was Resin I except that an equivalent amount on a molecular weight basis of vinyl benzyl chloride was substituted for one half the amount of styrene that was used in preparing Resin I. The resulting styrenated resin contained 34.0 weight percent chlorine by elemental analysis.

EXAMPLES 7 TO 12

Tables I through VI below show the results of fire retardance tests by the ASTM D-757-65 test method on castings of the resin prepared as described in Examples 1 to 6, (Resins I to VI, respectively). The castings were prepared by mixing 100 parts by weight of resin with copper compound in the amount indicated in the tables, 0.2 parts of 12 percent cobalt octoate, and such other additives as are indicated in the tables. After at least 10 minutes' stirring to assure uniform dispersion of the immiscible materials, the catalyst, methyl ethyl ketone peroxide (60% in dimethyl phthalate), 1 part was added, stirred for 1 to 2 minutes, and then the mixture was allowed to cure at 25° centigrade for 16 hours and at 65° centigrade for 8 hours. The castings were then removed from the mold, cut into specimen bars for testing by ASTM D-757-65 test method, for smoke by ASTM D-2843-70, and for heat deflection temperature (identified in the tables as "HDT") by ASTM D-648-72 test method. Data on light absorption due to smoke obscuration was acquired by a computer which printed out the light absorption and percent smoke at one second intervals. The "Smoke Density Rating" of this modification of the ASTM test is the percent smoke at 60 seconds. Samples which were used for the ASTM D-648-72 test measured 0.5 inch × 0.5 inch × 0.125 inch.

TABLE I

Fire Retardant Synergism of Copper Compounds with Resin I

| Casting No. | Compound | Weight Percent | HDT | ASTM D-757-65 Burn Rate (in/min) | Flameout Time (secs) | Smoke Density Rating, % |
|---|---|---|---|---|---|---|
| A | None | | 115 | 0.20 | 160 | 60 |
| B | Antimony oxide | 1 | 86 | 0.09 | 140 | 52 |
| C | CuO | 0.25 | 83 | 0.11 | 0 | |
| D | CuO | 0.50 | 85 | 0.11 | 0 | |
| E | CuO | 1.0 | 81 | 0.10 | 12 | 55 |
| F | CuO | 1.5 | 83 | 0.11 | 0 | |
| G | CuO | 2.0 | 84 | 0.09 | 0 | |
| H | CuO | 3.0 | 81 | 0.10 | 0 | |
| I | $CuCl_2$ | 1 | 84 | 0.20 | 140 | |
| J | $CuSO_4$ | 1 | 84 | 0.12 | 30 | |
| K | Cu | 1 | 83 | 0.13 | 100 | |
| L | $CuCl_2 \cdot 2H_2O$ | 1 | 82 | 0.15 | 75 | |
| M | $CuSO_4$ | 2 | 85 | 0.11 | 22 | |
| N | $Cu_2O$ | 1 | 84 | 0.14 | 70 | |
| O | CuCN | 1 | 81 | 0.18 | 112 | |
| P | $CuCO_3$ | 1 | 82 | 0.13 | 50 | |
| Q | Copper oxychloride | 1 | 80 | 0.12 | 72 | |
| R | $CuSO_4$ (anhydrous) | 1 | 81 | 0.08 | 100 | 53 |
| S | CuO | 10 | 88 | 0.09 | 0 | |
| T | Copper Chromate | 1 | 87 | 0.18 | 130 | 58 |
| U | Copper Tungstate | 1 | 87 | 0.16 | 110 | 58 |
| V | Copper thiocyanate | 1 | 87 | 0.16 | 105 | 52 |
| W | Copper borate | 1 | 89 | 0.16 | 105 | 51 |
| X | Cupric phosphate | 1 | 87 | 0.13 | 88 | 48 |
| Y | Cupric phosphate | 2 | 86 | 0.09 | 3 | 55 |
| Z | Cupric bromide | 2 | 82 | 0.12 | 0 | 60 |

TABLE II

Fire Retardant Synergism of Copper Compounds with Resin II

| Casting No. | Compound | Weight Percent | HDT | ASTM D-757-65 Burn Rate (in/min) | Flameout Time (secs) | Smoke Density Rating, % |
|---|---|---|---|---|---|---|
| BA | None | | 91 | 0.58 | 180 | 30 |
| BB | Antimony oxide | 1 | 93 | 0.22 | 180 | 44 |
| BC | CuO | 1 | 86 | 0.48 | 180 | 50 |
| BD | Copper oxychloride | 1 | 86 | 0.37 | 180 | 32 |
| BE | Copper carbonate | 1 | 86 | 0.45 | 180 | 39 |
| BF | Copper sulfate, anhyd. | 1 | 87 | 0.48 | 180 | 37 |

TABLE III

Fire Retardant Synergism of Copper Compounds with Resin III

| Casting No. | Compound | Weight Percent | HDT | ASTM D-757-65 Burn Rate (in/min) | Flameout Time (secs) | Smoke Density Rating, % |
|---|---|---|---|---|---|---|
| CA | None | | 78 | 0.55 | 180 | 76 |

TABLE III-continued

Fire Retardant Synergism of Copper Compounds with Resin III

| Casting No. | Compound | Weight Percent | HDT | ASTM D-757-65 Burn Rate (in/min) | Flameout Time (secs) | Smoke Density Rating, % |
|---|---|---|---|---|---|---|
| CB | Copper sulfate hydrate | 1 | 78 | 0.31 | 150 | 71 |
| CC | Copper oxide | 1 | 76 | 0.32 | 175 | |
| CD | Copper oxychloride | 1 | 75 | 0.28 | 165 | |
| CE | Copper carbonate | 1 | 78 | 0.25 | 155 | |

TABLE IV

Fire Retardant Synergism of Copper Compounds with Resin IV

| Casting No. | Compound | Weight Percent | HDT | ASTM D-757-65 Burn Rate (in/min) | Flameout Time (secs) | Smoke Density Rating, % |
|---|---|---|---|---|---|---|
| DA | None | | 74 | 0.17 | 0 | 70 |
| DB | Antimony oxide | 1 | 75 | 0.16 | 0 | 66 |
| DC | Copper oxide | 1 | 77 | 0.16 | 0 | |
| DD | Copper oxide | 2 | 74 | 0.17 | 0 | |
| DE | Copper oxide | 3 | 76 | 0.15 | 0 | |

TABLE V

Fire Retardant Synergism of Copper Compounds with Resin V

| Casting No. | Compound | Weight Percent | HDT | ASTM D-757-65 Burn Rate (in/min) | Flameout Time (secs) | Smoke Density Rating, % |
|---|---|---|---|---|---|---|
| EA | None | | 84 | 0.18 | 85 | 65 |
| EB | Antimony oxide | 1 | 85 | 0.10 | 0 | 54 |
| EC | Copper oxide | 1 | 86 | 0.06 | 0 | 65 |
| ED | Copper oxychloride | 1 | 87 | 0.07 | 0 | 67 |
| EE | Copper carbonate | 1 | 84 | 0.08 | 0 | 63 |
| EF | Copper sulfate, anhyd. | 1 | 86 | 0.08 | 0 | 64 |

TABLE VI

Fire Retardant Synergism of Copper Compounds with Resin VI

| Casting No. | Compound | Weight Percent | HDT | ASTM D-757-65 Burn Rate (in/min) | Flameout Time (secs) | Smoke Density Rating, % |
|---|---|---|---|---|---|---|
| FA | None | | 78 | 0.19 | 100 | 40 |
| FB | Antimony oxide | 1 | 77 | 0.15 | 85 | 42 |
| FC | Copper oxychloride | 1 | 79 | 0.16 | 30 | 23 |

The data shown in Table I indicate that while copper oxide is about equivalent to antimony trioxide in burning rate and smoke density rating, the incorporation of copper oxide in the polyester Resin I greatly reduced the flammability as measured in the "Time to Flameout." Further, it was observed that the incorporation of hydrated copper sulfate, cupric chloride, copper carbonate, copper oxychloride, anhydrous copper sulfate, and copper phosphate in Resin I imparted fire retardance while retaining the translucent character of the resin. By contrast, antimony trioxide results in an opaque casting.

The data set forth in Table II serve to indicate that the 19 weight percent halogen content of Resin II is about as low as can be utilized with the copper compounds to provide synergism. The incorporation of copper oxychloride, copper carbonate and copper sulfate not only provided fire retardant polyester resins, but also resulted in retaining the translucent character of Resin II.

The data set forth in Table III indicate that while smoke improvement is minimal, the flameout time and burn rate were improved over the control Resin III. Translucent compositions resulted when copper sulfate, copper oxychloride and copper carbonate were utilized as the fire retardant additive.

The data set forth in Table IV show that in Resin IV copper oxide was about comparable to the activity shown for antimony trioxide.

The data set forth in Table IV show that the incorporation of the copper compounds gave improved burning rate and flameout time compared to the use of antimony trioxide. Smoke densities for the compositions containing copper compounds were comparable to the control Resin V.

In the data set forth in Table VI, copper oxychloride was shown to have improved flameout time, much improved smoke rating and about comparable burning rate when compared to antimony trioxide. Additionally, the composition containing copper oxychloride retained in translucent character of the base Resin VI.

The foregoing specification is intended to illustrate the invention with certain preferred embodiments, but it is understood that the details disclosed herein can be modified without departing with the spirit and scope of the invention.

We claim:

1. An unsaturated polyester composition which is copolymerizable with an unsaturated monomer to form a fire retardant polymer composition, said unsaturated polyester composition comprising an α,β-ethylenically unsaturated polyester of a polycarboxylic compound and a polyhydric alcohol, which contains halogen in a proportion of greater than about 4.4 weight percent, and about 0.55 to about 50 weight percent of copper or a copper compound.

2. A copolymerizable mixture of an unsaturated polyester composition and a copolymerizable ethylenically unsaturated monomer capable of copolymerization to form a fire retardant polymer composition, said unsaturated polyester composition comprising an α-,β-ethylenically unsaturated polyester of a polycarboxylic compound and a polyhydric alcohol, which contains halogen in a proportion of greater than about 4 weight percent, and an effective fire retardant proportion of about 0.5 up to about 5 weight percent of copper or a copper compound, wherein said proportions are based on the weight of unsaturated polyester and copolymerizable unsaturated monomer.

3. The composition of claim 2 wherein said halogen is present as a halogen containing polycarboxylic compound.

4. The composition of claim 3 wherein said halogen is chlorine.

5. The composition of claim 3 wherein said polycarboxylic compound is chlorendic acid or chlorendic anhydride.

6. The composition of claim 3 wherein said polycarboxylic compound is tetrachlorophthalic anhydride.

7. The composition of claim 2 wherein the haogen is bromine.

8. The composition of claim 3 wherein said polycarboxylic compound is tetrabromophthalic anhydride.

9. The composition of claim 2 wherein said halogen is chlorine and bromine.

10. The composition of claim 9 wherein said halogen is present as chlorendic acid or anhydride and dibromopropanol.

11. The composition of claim 2 wherein said copper compound is an essentially colorless copper salt.

12. The composition of claim 11 wherein the copper salt is anhydrous cupric sulfate.

13. The composition of claim 2 wherein said copper compound is a copper salt that permits transmission of light when said polyester is copolymerized with an ethylenically unsaturated monomer.

14. The composition of claim 13 wherein said copper salt is hydrated cupric sulfate.

15. The composition of claim 13 wherein said copper salt is hydrated cupric chloride.

16. The composition of claim 13 wherein said copper salt is cupric carbonate.

17. The composition of claim 13 wherein said copper salt is copper oxychloride.

18. The composition of claim 13 wherein said copper salt is copper thiocyanate.

19. The composition of claim 13 wherein said copper salt is cupric phosphate.

20. The composition of claim 2 wherein said copper compound is copper oxide.

21. The composition of claim 20 wherein said copper oxide is cupric oxide.

22. The composition of claim 2 wherein said copper compound is an insoluble compound.

23. The composition of claim 2 wherein said copper compound is copper chromate.

24. The composition of claim 2 wherein said copper compound is cupric bromide.

25. The composition of claim 2 wherein said copper compound is copper tungstate.

26. The composition of claim 2 wherein said copper compound is copper borate.

27. The mixture of claim 2 wherein said monomer is styrene.

28. The mixture of claim 2 when copolymerized to an infusible product.

29. The composition of claim 2 when mixed with an inert filler and copolymerized to an infusible, insoluble product.

30. The composition of claim 2 when mixed with a reinforcing agent and copolymerized to an infusible, insoluble reinforced product.

31. A laminated article comprised of copolymerized sheets of the composition of claim 2 admixed with a reinforcing agent.

32. A copolymerizable mixture of an unsaturated polyester composition and a copolymerizable ethylenically unsaturated monomer capable of copolymerization to form a translucent fire retardant polymer composition, said unsaturated polyester composition comprising an unsaturated polyester of chlorendic acid or anhydride, an unsaturated dicarboxylic acid or anhydride and a dihydric alcohol, which contains halogen in a proportion of greater than about 20 weight percent and a proportion of about 0.5 to about 2 weight percent of a copper compound that permits transmission of light when said polyester is copolymerized with said monomer, wherein said proportions are based on the weight of said unsaturated polyester and said monomer.

33. The composition of claim 32 wherein the copper compound is copper sulfate.

* * * * *

UNITED STATES PATENT AND TRADEMARK OFFICE
CERTIFICATE OF CORRECTION

PATENT NO. : 3,992,480
DATED : November 16, 1976
INVENTOR(S) : Edwin Dorfman et al.

It is certified that error appears in the above-identified patent and that said Letters Patent are hereby corrected as shown below:

At Column 3, line 8, for "either polycarboxylic" read "either a polycarboxylic".

At Column 3, line 44, for "acids" read "acid".

At Column 12, line 60, for "retained in" read "retained the".

At Column 13, line 32, for "haogen" read "halogen".

Signed and Sealed this

Seventh Day of June 1977

[SEAL]

Attest:

RUTH C. MASON
Attesting Officer

C. MARSHALL DANN
Commissioner of Patents and Trademarks